Dec. 26, 1950      W. A. BARNES      2,535,383
DOVETAIL TOOL
Filed Oct. 5, 1945
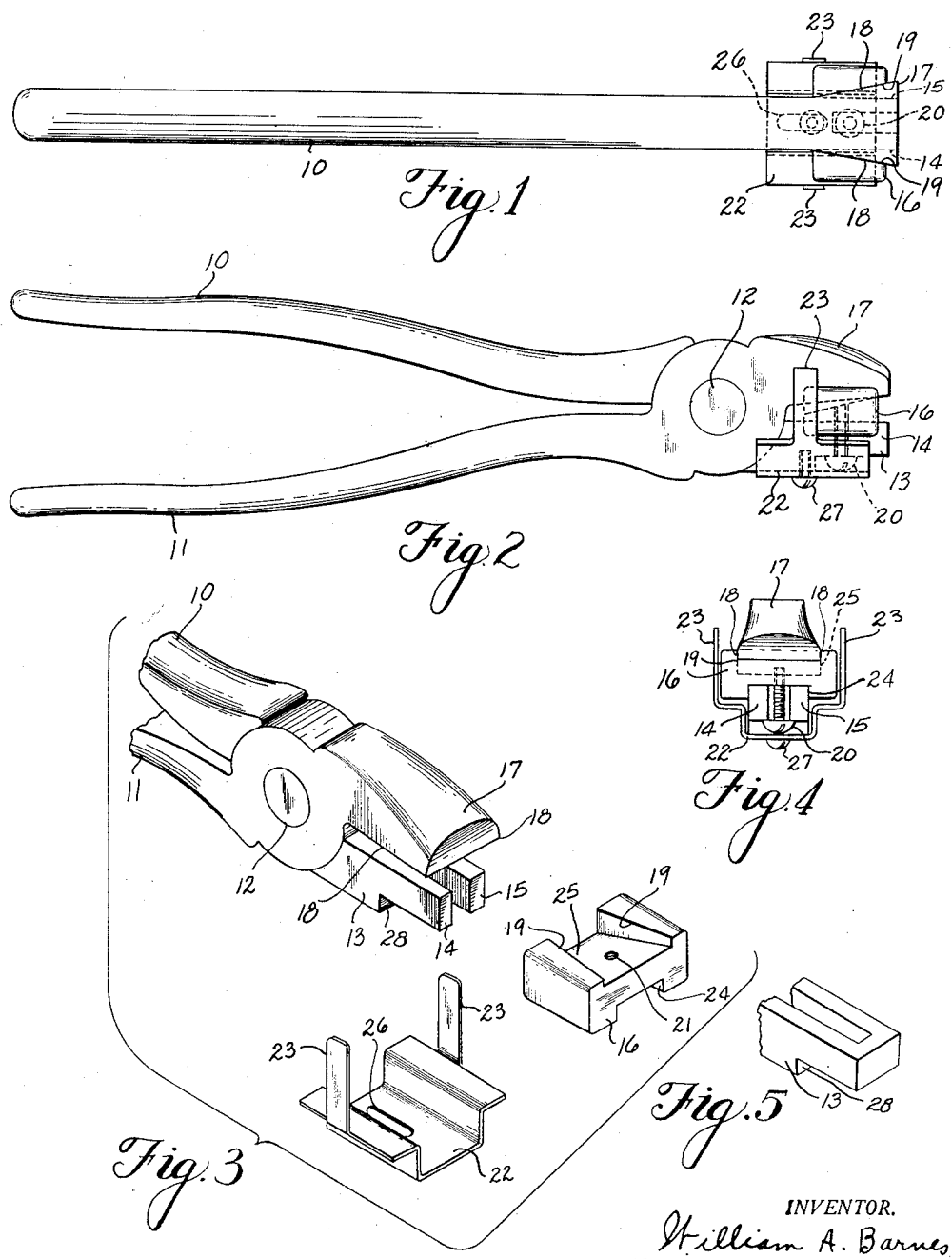

UNITED STATES PATENT OFFICE 2,535,383

DOVETAIL TOOL

William A. Barnes, Utica, N. Y., assignor to Utica Drop Forge & Tool Corporation, a corporation of New York Application October 5, 1945, Serial No. 620,584

4 Claims. (Cl. 30—229)

This invention relates in general to shearing tools, and more particularly to a hand tool for cutting dovetail blanks in the edge of sheet material.

An object of this invention is to provide adjustability between dovetail jaw cutting members in order to maintain the cutting members in close cutting relationship, and to provide jaws that may be resharpened and readjusted.

Other objects and a fuller understanding of my invention may be had by referring to the following description and claims, taken in conjunction with the accompanying drawing, in which:

Figure 1 is a plan top view of a hand tool employing the improved adjustable jaw feature;

Figure 2 is a side elevational view of the tool;

Figure 3 is an exploded view of the jaw end of the tool showing the relationship of the parts; and Figure 4 is an end view of Figure 2.

In sheet metal work, it is often desired to form a series of dovetail blanks along the margin of sheet plates, pipes, or cylindrical forms, for the purpose of joining or dovetailing two pieces together. Dovetailing of this nature, has for many years been done by single shearing cutting tools, and recent years by cutting tools adapted to cut two spaced incisions at one time by means of a combination of male and female cutting dies having spaced cutting edges co-acting to form the spaced incisions simultaneously. However, tools of this nature require very close relationship between the cutting edges and therefore it has been considered necessary to provide replaceable cutting faces on the jaws which may be discarded and replaced by new cutting faces from time to time. However, these prior art devices have failed to provide adjustability in their jaws, whereby one jaw may be moved relative to the other, or one renewable cutting surface may be moved relative to the other, to provide good cutting cooperation between the cutting faces. Thus, the replaceable cutting faces must be made with a high degree of precision, and even then after they are worn a slight amount will operate less efficiently and must be replaced. My invention is directed to overcoming this handicap and remove the necessity for high precision fitting and replacement after slight wear.

With reference to the drawing, I illustrate the preferred embodiment of my invention as incorporated in a plier-like hand tool and comprising co-acting jaw members 13 and 17 operated by means of handles 10 and 11 pivoted together by means of a pivot 12. In this preferred embodiment, the first jaw member 13 has two laterally spaced cantilever members 14 and 15 extending longitudinally forward in spaced relation from the area of the pivot 12 to provide a space therebetween. A satisfactory alternative construction could be obtained by making a solid jaw 13 with an elongated slit therein. That is, the extremities of the cantilevers 14 and 15 could be joined together in a solid construction. The second jaw member 17 comprises a male shearing member and has two diverging side cutting edges 18 which gives the jaw 17 a dovetail longitudinal configuration.

A die member 16, having a longitudinal channel 25 therein with diverging side cutting edges 19, is adapted to be carried by the jaw 13. A groove 24 is provided on the die member 16 of sufficient width to permit the die 16 to slide freely backward and forward upon the cantilever members 14 and 15, as best illustrated in the Figure 4. The die 16, with the diverging sides 19 and the channel 25, constitutes a female shearing member. This female shearing member is dimensioned to allow the jaw 17 to operate therein with a close fit between the sides 18 and 19 to provide interfitting shearing sides. Preferably, when originally constructed, cutting sides of the die channel 25 form a close fit with the jaw 17 at a point close to the rearwardly portion of the jaw 17 near the pivot 12. Therefore, if wear causes the sides 18 and 19 to be spaced too far apart for good cutting cooperation, the jaw 17 may be moved downwardly into the channel 25 and the die 16 shifted forwardly such as by tapping on the end thereof until the sides 18 and 19 are reasonably close and the cutting cooperation restored. Further, if the sides 18 and 19 have become excessively rounded or pitted to the extent that the described adjustment will not restore the cutting cooperation, the edges may be resharpened by grinding, and the die thereafter adjusted as described. Therefore, it has been found that one adjustable die member as illustrated, is able to serve for the normal life of the tool.

The die 16 is movably secured to the jaw 13 by the provision of a threaded opening 21 to receive the screw end of a screw 20 which serves as a holding member. As illustrated best in the Figure 4, the screw 20 is provided with a head large enough to engage the bottom sides of the cantilevers 14 and 15, and of sufficient length to extend from the bottom of the cantilevers up into the threaded opening 21. Thus, the die 16 is readily held in any desired position upon the jaw 13 by tightening the screw 20 firmly in the opening 21. Thereafter, adjustment of the die 16 is readily made by loosening the screw 20.

The jaw member 17, as illustrated in the drawing, comprises a one piece male shearing member integrally connected to the handle 11. It is understood, of course, that the jaw 17 may be formed in a manner similar to the jaw 13, and a detachable male shearing element attached thereto, if desired. However, it has been found that by having one member of a dovetail cutting assembly adjustable, an integral jaw member to cooperate with the adjustable member as illustrated, will have a sufficiently long life without necessarily resorting to a replaceable cutting section. The cutting edges 18 of the jaw may be resharpened from time to time with the removal of only a very minute amount of metal from the surface thereof. The die member 16 is then easily shifted forward to bring the sides 18 and 19 into close cutting relationship because of the dovetail configuration of the shearing elements.

In operation, the jaws 13 and 17 are moved apart and a sheet of material placed therein. Of course, it will readily be understood that only two sides of the sheet will be cut. That is, two diverging spaced slits will be made from the edge of the material inward. The material between the two cuts will not be removed because there are no cutting surfaces on the ends of the jaws. Thus, a dovetail blank is cut from the material which may be bent in either an upwardly or downwardly direction to form a dovetail flange. The blank may be bent by the tool if desired after the material is cut by closing the jaws together.

With an adjustable jaw of the kind described, the point at which the cutting operation will begin will be determined by the relative position of the die 16 upon the lower jaw 13. Therefore, I have provided a convenient stop means 22 having upright stop arms 23 thereon for use in gauging the depth of the penetration of the sheet material into the jaws. That is, the stop means 22 may be held in place upon the jaw 13 by the provision of an elongated slot 26 through which a screw member 27 may extend and engage the jaw 13. Because of the longitudinal configuration of the slot 26 the stop member 22 will be adjustable forwardly or rearwardly as desired to limit the depth of the slots, and to make appropriate adjustments for the relative position of the die member 16.

As a further improvement, I have provided an off-set portion 28 on the lower surface of the jaw 13, whereby the screw 20 is removed from the path of adjusting movement of the stop 22. Note, in Figure 2, that the head of the screw 20 is positioned in the off-set portion 28, and is covered by the bottom of the stop 22. Thus, the screw 20, which holds the die 16, and is seldom required to be moved, is conveniently out of the way, and the screw 27, which is often loosened to move the stop 22, is exposed and easily accessible. Further, this arrangement of off-set screws 20 and 27 eliminate the necessity of realigning the cutting edges 18 and 19 each time the stop 22 is moved.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a tool having co-acting jaw members for partially cutting a blank from sheet material to form a dovetail, the improvement of shearing elements for said jaws, comprising, a first jaw member having a die holding top surface and a bottom surface including a guide clamp surface and a die stamp surface in stepped relationship with an elongated slot extending from the die holding top surface to the die clamp surface, a die member having a first channel therein of diverging dovetail longitudinal configuration comprising a female shearing member and a second channel therein to form a slip fit with said first jaw member, screw means extending through the elongated slot of the first jaw member and engaging the die member and the said die clamp surface to clampingly hold said die member on said first jaw die holding surface; a second jaw member having a diverging dovetail longitudinal formation comprising a male shearing member, said male and female shearing members having cooperating shearing surfaces on the diverging sides thereof, said die member being shiftable by relative longitudinal movement of said die second channel upon said first jaw member to shift the die in relation to said second jaw member and maintain said shearing surfaces in shearing relationship, and stop means comprising substantially U-shaped member having an elongated slot at the bottom thereof, screw means extending through the elongated slot and movably clamping said guide to said first jaw guide clamp surface, said stop member being movable in relation to said first jaw member and extendable past said die holding screw means.

2. In a tool having co-acting jaw members for partially cutting a blank from sheet material to form a dovetail, the improvement of shearing elements for said jaws, comprising, a first jaw member comprising two laterally spaced cantilever members, a second jaw member of dovetail longitudinal formation comprising a male shearing member, a die member having a dovetail longitudinal channel therein comprising a female shearing member, said male and female shearing members having cooperating shearing surfaces on the diverging dovetail sides thereof, and a holding member extending between said spaced cantilever members and engaging both the said cantilever members and the adjustable die members, whereby said die member may be held firmly upon said cantilever members and may be shifted longitudinally thereon to compensate for wear of said cooperating shearing surfaces.

3. In a tool having co-acting jaw members for partially cutting a blank from sheet material to form a dovetail, the improvement of shearing elements for said jaws, comprising, a first jaw member comprising two laterally spaced cantilever members, a second jaw member of dovetail longitudinal formation comprising a male shearing member, a die member having a dovetail longitudinal channel therein comprising a female shearing member, said male and female shearing members having cooperating shearing surfaces on the diverging dovetail sides thereof, said die member being disposed to seat upon said cantilever members, interlocking surfaces between said die member and cantilever member to hold said die member against lateral movement, and a holding member extending between said spaced cantilever members and engaging both the said cantilever members and the adjustable die member, whereby said die member may be held firmly upon said cantilever members and may be shifted longitudinally thereon to compensate for wear of said cooperating shearing surfaces.

4. In a tool having co-acting jaw members for partially cutting a blank from sheet material to form a dovetail, the improvement of shearing elements for said jaws, comprising, a first jaw member comprising a cantilever member having two spaced portions defining a longitudinal slot therein, a second jaw member of dovetail longitudinal formation comprising a shearing member, an adjustable die member having a dovetail longitudinal formation comprising a shearing member, said jaw and die members having cooperating shearing surfaces on the diverging dovetail sides thereof, and a holding member extending through said slot in said cantilever member and engaging both the said cantilever member and the adjustable die member, whereby said die member may be held firmly upon said cantilever member and may be shifted longitudinally thereon to compensate for wear of said cooperating shearing surfaces.

WILLIAM A. BARNES.

REFERENCES CITED

The following references are of record in the file of this patent:

UNITED STATES PATENTS

| Number | Name | Date |
|---|---|---|
| 338,146 | Ewan | Mar. 16, 1886 |
| 1,602,169 | Purnell | Oct. 5, 1926 |

Certificate of Correction

Patent No. 2,535,383 December 26, 1950

WILLIAM A. BARNES

It is hereby certified that error appears in the printed specification of the above numbered patent requiring correction as follows:

Column 4, line 11, for the word "stamp" read *clamp*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*